A. THIELE.
REPAIRING PATCH FOR PNEUMATIC TIRE
APPLICATION FILED JUNE 10, 1919.

1,422,495.

Patented July 11, 1922.

Inventor:
Alfred Thiele
By [signature]
Attorney.

UNITED STATES PATENT OFFICE.

ALFRED THIELE, OF MAGDEBURG, GERMANY, ASSIGNOR TO FIRM OF EMMY-THIELE, OF BERLIN, GERMANY.

REPAIRING PATCH FOR PNEUMATIC TIRES.

1,422,495.  Specification of Letters Patent.  Patented July 11, 1922.

Application filed June 10, 1919. Serial No. 303,216.

(GRANTED UNDER THE PROVISIONS OF THE ACT OF MARCH 3, 1921, 41 STAT. L., 1313.)

*To all whom it may concern:*

Be it known that I, ALFRED THIELE, a resident of Magdeburg, a citizen of the German Republic, have invented certain new and useful Improvements in Repairing Patches for Pneumatic Tires (for which I have filed applications in Germany on March 23, 1917, Patent No. 310,944, and Austria on February 15, 1918), of which the following is a specification.

The present invention relates to repair patches for pneumatic tires, and it has for its object, briefly stated, the provision of an improved patch of the general character indicated which is so constructed that when applied to the punctured portion of an inner tube or tire, it will hermetically close the puncture; the patch, in slightly modified form, being capable of use with equal facility to effectively join together and seal the ends of a tube or tire.

Repair patches heretofore used have generally been constructed of rubber and have been applied against the punctured portion of the tire and secured thereto either by vulcanization or merely by a suitable adhesive. Both methods of affixing the patches have proven objectionable, however, in that they require considerable time and are unreliable because the patches soon become loose no matter how carefully applied, the probable reason being that the elasticity of the rubber renders it impossible to cause an even and equal tight contact of the patch at all points with the surface of the tire.

According to my invention, the attachment of the patch is effected in such a way that the binding action, whether obtained by vulcanization or simply by the use of an adhesive, is assisted by the creation of suction spaces between the surfaces of the patch and the tire which enables the ordinary atmospheric pressure to be utilized in holding the patch in place during the time that the adhesive is setting. In order to obtain this effect, the inner face of the patch is provided with grooves which take the form of closed curves, and these grooves are made comparatively wide and deep and are given sharp or very abrupt edges, so that when the patch is pressed against the tire the air, together with almost all of the adhesive substance or solution contained in the grooves, will be forced out of the grooves, the air being also forced out from under the patch, with the result that vacua or partial vacua are created in said grooves, the creation of the vacua being assisted by the tendency of the elastic rubber to return to its normal or unstretched condition when the pressure upon it is removed at the conclusion of the operation. The adhesive substance or solution applied to the ungrooved portions of the patch between the grooves prevents the re-entrance of air into the evacuated spaces and, hence, preserves the vacua by acting, in a sense, as an obstruction to the air, this in addition to its ordinary binding action; and it also constitutes, to some extent at least, a support or stiffener for the patch. The total result is that the atmospheric pressure applied against the portions of the patch beneath which the evacuated spaces lie and which are distributed evenly and uniformly over the patch, will hold the latter against the tire and permit the complete and effective binding together of the two rubber surfaces.

An embodiment of the invention is illustrated in the accompanying drawing, in which.

Figure 1:
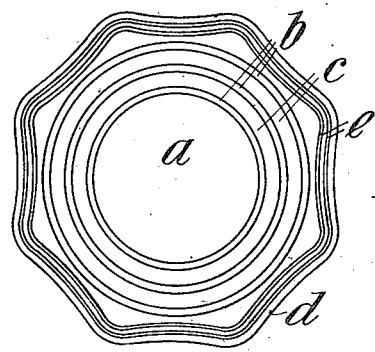
Fig. 1 is a bottom plan view of the improved patch.
Figure 2:
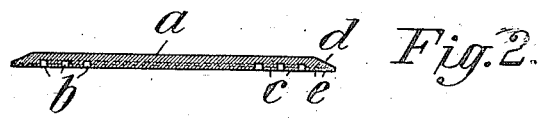
Fig. 2 is a diametric section thereof.
Figure 3:
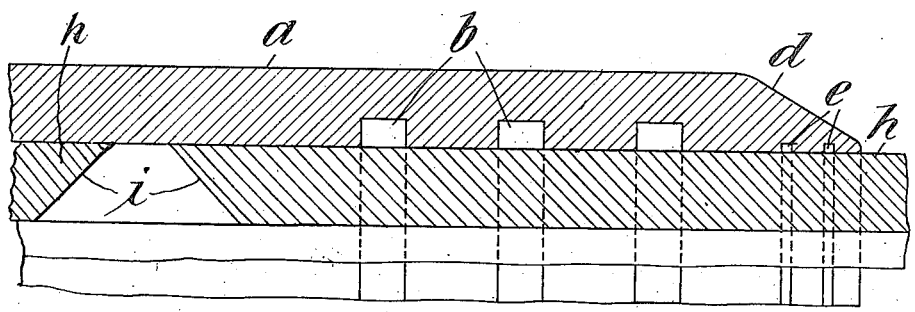
Fig. 3 is a fragmental sectional view on a greatly enlarged scale, showing the patch applied to a tire.

Referring to Figs. 1, 2 and 3, $a$ indicates generally the improved rubber patch which, as shown, has the form of an octahedron with rounded angles or corners, but which may be circular, elliptical or of any other suitable shape, as will be understood. The under face of the patch is provided with a plurality of grooves $b$, in the form of closed curves, here shown as circular, the number of grooves depending upon the size or shape, or both, of the patch. These grooves are disposed concentrically and are spaced sufficiently far apart to provide annular strengthening portions $c$ between adjacent grooves; and they are given substantial width and depth and are formed with sharp or abrupt edges, as will be seen in Fig. 3 and as has been previously stated. The edge $d$ of the patch is continuously beveled throughout its entire extent, and is formed with a plurality of smaller concentric grooves $e$ which follow the contour of said edge and are spaced apart from one another, the object being to prevent the edge from lifting or scaling off from the tire.

In securing the patch, the latter is applied to the tire $h$ in such a way that its ungrooved central portion exactly covers the puncture $i$, the adhesive having first been spread over the entire under face of the patch so as to fill both sets of grooves. Pressure is then exerted upon the patch in any suitable manner directly over the grooves so as to expel the air therefrom and force it out from beneath the patch, the pressure having the effect of forcing out almost all of the adhesive from the grooves.

Figure 4:
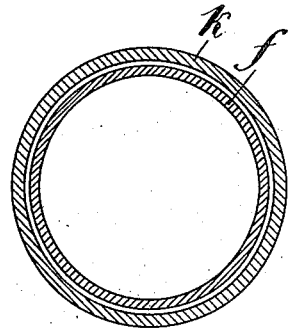
Figs. 4 and 5 are transverse and longitudinal sectional views, respectively, showing the patch, in modified form, utilized to join the ends of a tire or tube.
Figure 5:
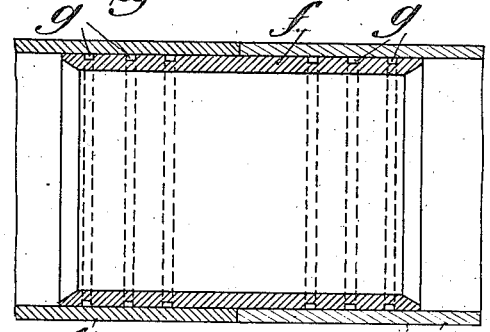

The modified form of patch represented in Figs. 4 and 5 is designed for use in joining together the two ends $k$ and $l$ of a tire, as has already been explained, the patch $f$ in this instance having the form of a short, open-ended tube or sleeve. The grooves $g$ are formed circumferentially in the face of the patch to be coated and are disposed in spaced parallel relation to one another in the opposite end portions of the patch, the central portion of the patch being left ungrooved (see Fig. 5). In applying this patch, its grooved face is first coated with the adhesive, and then the tire ends are brought into engagement with the patch. According to the arrangement illustrated it is the outer face of the patch which is grooved and coated, and in that case the ends of the patch are inserted into the tire ends to form the joint, the procedure being substantially the same as that described above in connection with Figs. 1 to 3.

In the foregoing description, reference has been made throughout to the invention as applied to a "tire", but such term is used in its broad sense as covering both a so-called "single-tube tire" and the ordinary inner tube or member of a tire of which the outer member consists of a hollow shoe or carcass.

I claim as my invention:—

A patch for rubber tires, tubes and the like, having a series of juxtaposed, wide and deep grooves provided in the face thereof which is to be applied to the tire and having the central portion of its said face left plane, said grooves being in the form of concentric, closed curves which are spaced from one another and which have sharp or abrupt edges throughout their entire extent; whereby when the grooved face of the patch is coated with an adhesive substance and is applied to the tire, the application of pressure upon the patch along the grooved portion thereof will expel the air and most of the adhesive from said grooves and will force the air out from between the patch and the tire so as to create vacua in said grooves, and the adhesive substance will prevent the re-entry of air into said grooves, so that the patch will be held uniformly and evenly against the tire by the pressure of the atmospheric air during the setting of the adhesive substance.

In testimony whereof I have affixed my signature.

ALFRED THIELE.